Jan. 9, 1945.   F. A. FAHRENWALD   2,367,170
HEATER
Filed Jan. 2, 1942   5 Sheets-Sheet 1

Inventor:
Frank A. Fahrenwald, DECEASED
BY Marjorie P. Fahrenwald, Executrix
By Freeman, Sweet and Albrecht Attys.

Jan. 9, 1945.   F. A. FAHRENWALD   2,367,170
HEATER
Filed Jan. 2, 1942    5 Sheets-Sheet 2

Inventor:
Frank A. Fahrenwald Deceased,
BY Marjorie P. Fahrenwald,
Executor
By: Freeman, Sweet and Albrecht
Attys.

Jan. 9, 1945.  F. A. FAHRENWALD  2,367,170
HEATER
Filed Jan. 2, 1942  5 Sheets-Sheet 3
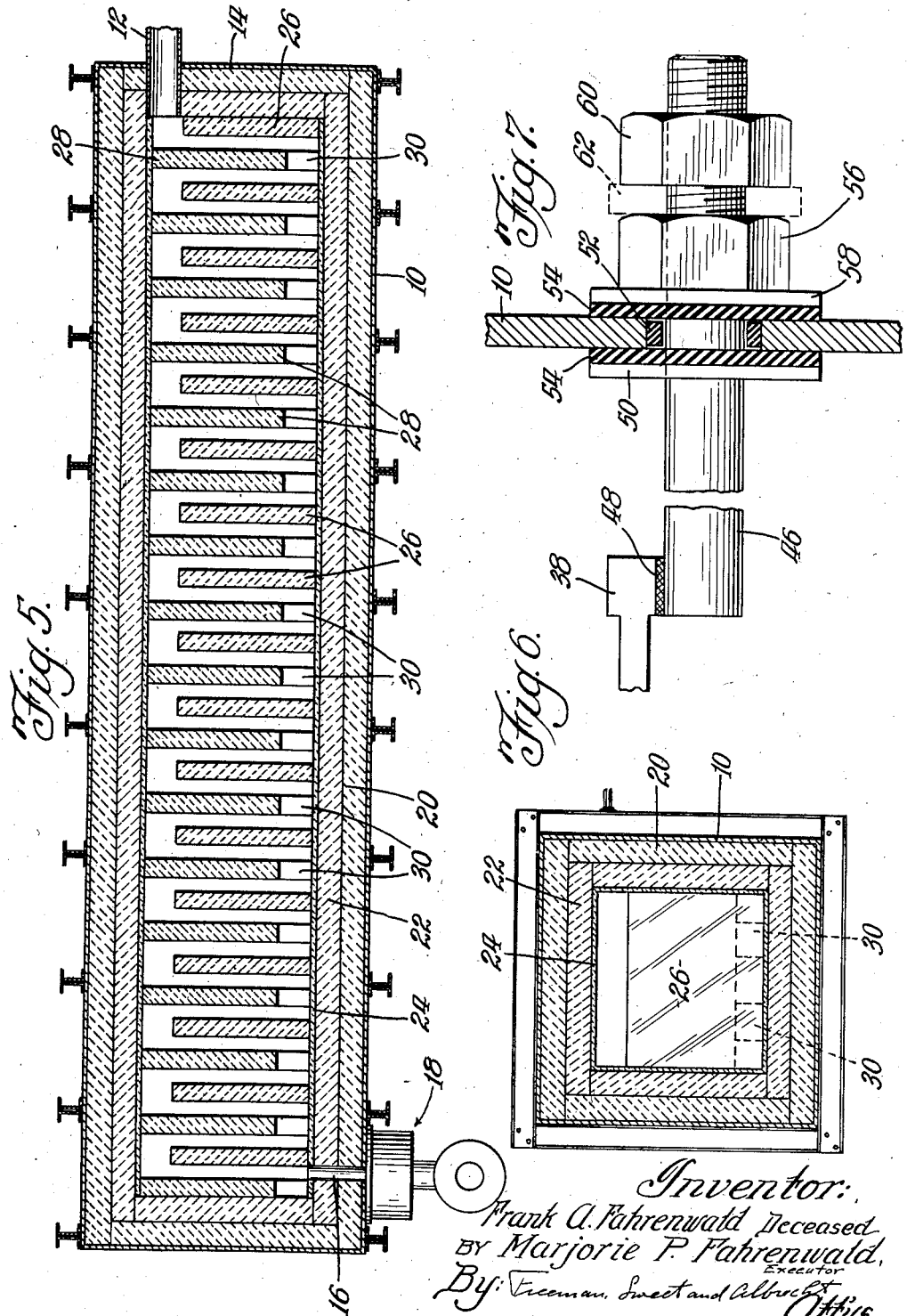

Jan. 9, 1945. F. A. FAHRENWALD 2,367,170
HEATER
Filed Jan. 2, 1942 5 Sheets-Sheet 4

Inventor:
Frank A. Fahrenwald, Deceased.
By Marjorie P. Fahrenwald, Executor
By: Freeman, Sweet and Albrett Attys.

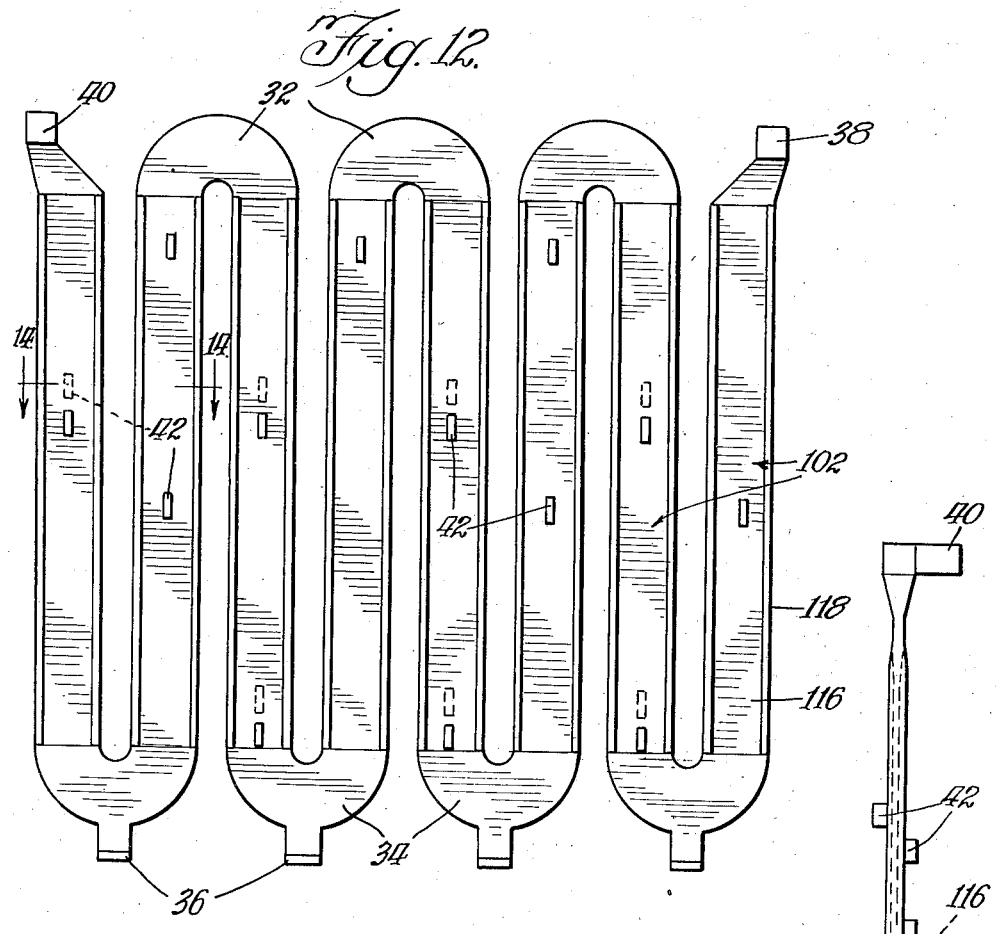
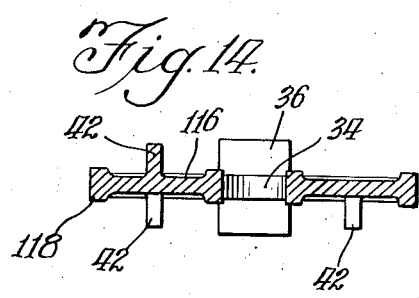

Patented Jan. 9, 1945

2,367,170

UNITED STATES PATENT OFFICE 2,367,170

HEATER

Frank A. Fahrenwald, deceased, late of Chicago, Ill., by Marjorie P. Fahrenwald, executrix, Chicago, Ill.

Application January 2, 1942, Serial No. 425,413

20 Claims. (Cl. 219—39)

This invention relates to the heating of gases. It is well known that radiant heat passes through most gases substantially without being absorbed by the gas, and accordingly, it is substantially impossible to heat the gas itself by radiation. It is necessary for the gas to have direct physical contact with a hot surface to raise its temperature. At the actual contact surface, heat is received by conduction, but unless this heat is rapidly disseminated and distributed through the body of the gas by convection, there is a tendency for the gas to form a quiescent insulating film on the gas-solid contact surface which greatly reduces the rate of heat transfer and impairs the efficiency of the operation.

The invention includes in its objects and advantages an apparatus in which the primary heating element in which the heat is generated, or to which the heat is delivered for transmission to the gas to be heated, is supplemented by additional means thermally inactive except for heat received by radiation from the primary heating element, to such a degree that much higher actual efficiencies than in the prior art can be obtained.

In the accompanying drawings:

Figure 5 is a central longitudinal section substantially as on line 5—5 of Figure 3 with the heating element omitted;

Figure 6 is a transverse section with the heating element omitted;

Figure 7 is a detail of a connection for the electrical power leads;

Figure 12 is a side elevation of one of the resistor grids;

Figure 13 is an edge elevation; and

Figure 14 is a section on line 14—14 of Figure 12.

Figure 1:
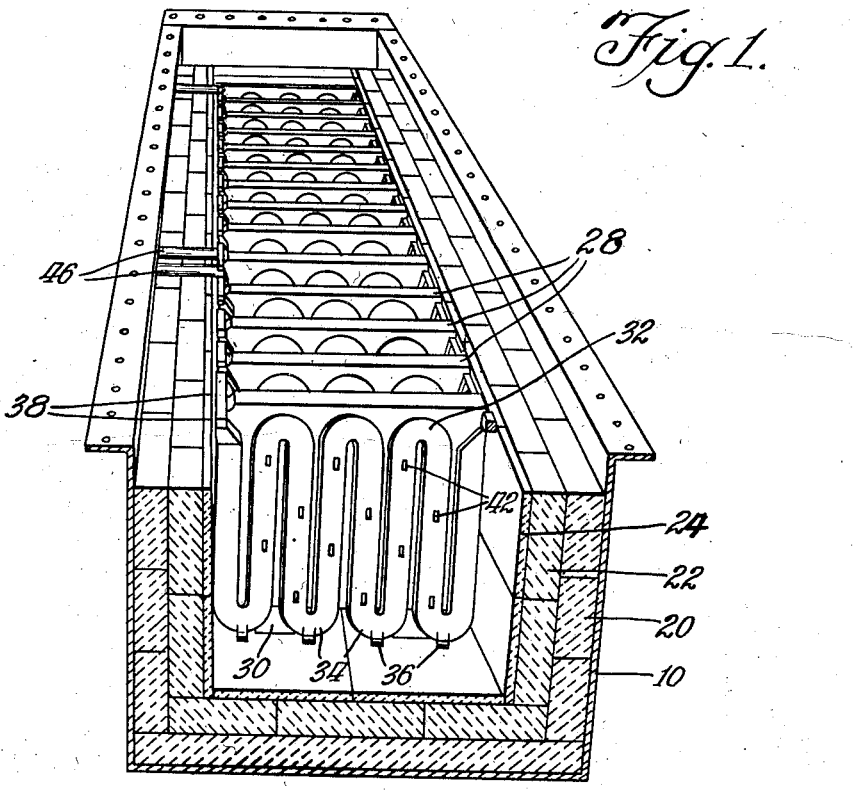
Figure 1 is a perspective view of a partially assembled electrical heating unit according to the invention.
Figure 2:
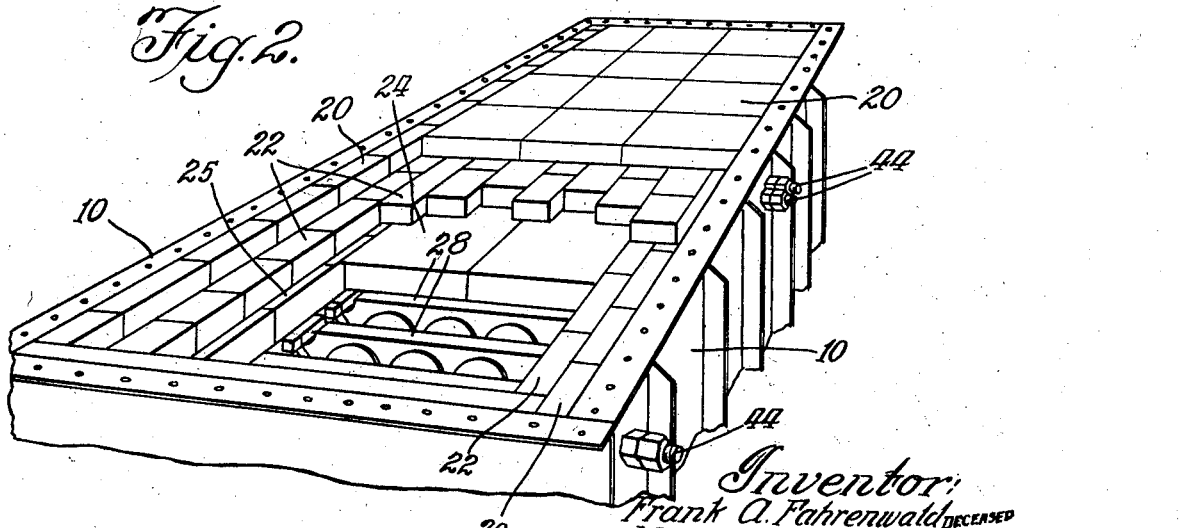
Figure 2 is a perspective view of the same unit in a later stage of assembly.
Figure 3:
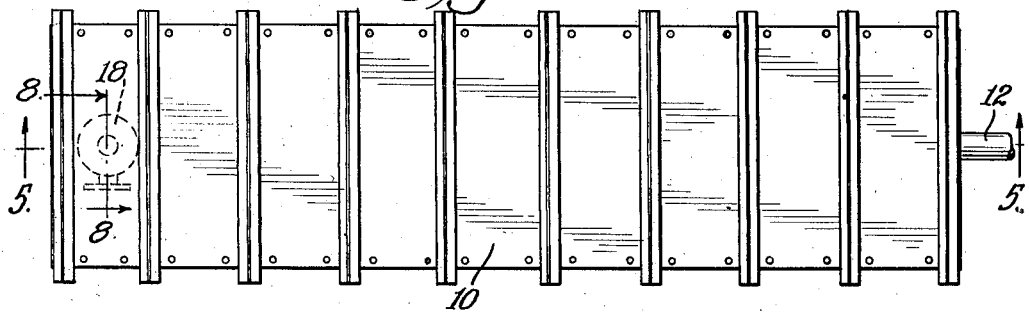
Figure 3 is a plan view, and Figure 4 a side elevation, of the complete unit.

In the embodiment of the invention selected for illustration, the main shell 10 is a welded gastight assembly of steel in the shape of a rectangular parallelepiped built up of steel plates with the abutting edges welded. The inlet pipe 12 is simply welded into the adjacent end plate 14 and the outlet pipe 16 opens downwardly through the special fitting 18 illustrated in detail in Figure 8. Inside the steel shell there is provided a plurality of refractory shells or linings. There is illustrated an outer lining 20, an intermediate lining 22, and an inner lining 24. The innermost lining has to be sufficiently heat-resistant to stand the working temperatures inside. Because refractory capable of withstanding maximum temperature can not be made with a low conductivity as it can when the required operating temperature is lower, the use of a plurality of layers makes it possible to use for the shell 22 a refractory that could not quite stand direct exposure to the direct heat but that has better insulating properties than the layer 24. Similarly, the layer 20 will be subjected to maximum temperatures much lower than either the layer 22 or the layer 24 and can be made of correspondingly higher thermal insulating value. The top portion of each side layer 24 includes one row of small blocks 25 along one edge, as shown in Figure 2. Figure 1 shows the assembly before the blocks 25 have been laid.

Within the space defined by the lining 24, there are a series of refractory separators. These separators also must stand the direct heat, but as they perform no insulating function, it is advantageous to have them of relatively high heat conductivity as well as specific heat so that, taken together, they constitute a heat reservoir of large capacity. The separators comprise lower separators 26 resting on the bottom of the chamber and upper separators 28 substantially identical with separators 26 except that they are substantially in contact with the top of the chamber. The gas passes over the top of each separator 26 and down to the bottom and under the bottom of the next separator 28 and so on from the inlet at 12 to the outlet at 16. The separators 28 are held up in position by a pair of spacer blocks 30.

In the spaces between the separators are the heating grids. In the present embodiment each grid is a serpentine of substantially uniform cross sectional area to secure uniform working temperature and having three top bights 32 and four bottom bights 34. From each of the bottom bights integral T-shaped pads 36 extend downwardly to support the grid. Thus both ends of the serpentine are at the upper corners of the casting, and from one of these corners a connecting lug 38 extends in one direction, and from the other corner an otherwise identical lug 40 extends in the other direction from the plane of the grid. And throughout the serpentine there are spacing lugs 42 at suitable intervals which serve as abutment members to define and maintain the spacing between the separators 26 and 28.

Figure 4:
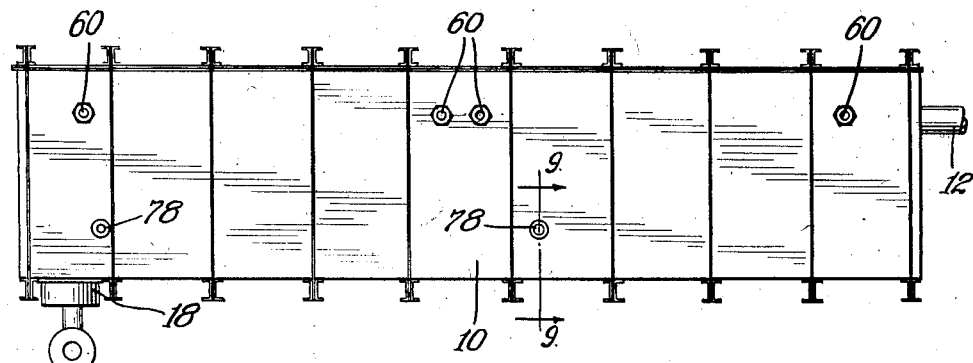

No tie rods or cement or other fastening means is required in assembling such a heating unit. After the side walls and bottom of the shell have been welded together, the refractory bottom layer 20 is simply laid in place in the form of bricks and the bottom layer 22 is laid on top of 20 and the bottom layer 24 is laid on top of the layer 22. Then the side layers 20, 22, and 24 are set up edgewise against the sides of the steel shell and the separators and grids are put in. The workman simply sets a separator 26 in place against the right hand end of the chamber as seen in Figure 4, and then sets a grid in place beside it, and then puts in a pair of spacer blocks 30 with a separator 28 on top of it and then another grid and so on until the other end of the chamber is reached. Then the lugs 38 and 40 on the grids may be welded together to connect the grids into series resistances as may be desired. Then the top refractory layer 24 is simply laid in place resting by its weight on the separators 28. Then the top refractory layer 22 is laid on the layer 24 and the top refractory layer 20 is laid on the layer 22. And finally, the top of the steel shell is simply laid in place on top of the refractory layer 20 and its edges bolted down against a suitable gasket. Even after the grids have been welded together, one can take hold of the parts inside the steel shell and rattle them a little to make sure that there is adequate clearance for thermal expansion when the parts get hot. It will be noted that in Figures 1 and 2 the bights 32 of only half the grids are visible, with the alternate pairs connected at the left having their connecting lugs in full view, and the pairs connected at the right having their connections almost entirely hidden by the separators 28.

The entire series of grids may be connected in a single series circuit to secure maximum resistance, or certain sections may be connected in parallel. Suitable current leads are indicated at 44 in Figure 2 and shown in detail in Figure 7. Each lead includes a reach 46 welded at 48 to one of the grids and formed with an integral flange 50. The housing 10 is apertured and insulated by the insulating annulus 52 and the insulating plates 54. The first nut 56 tightens the clamping washer 58 to compress the plates 54 between the washer 58 and the flange 50 to make a gas-tight seal, and the second nut 60 clamps the terminal 62 of the electric cable.

Figure 8:
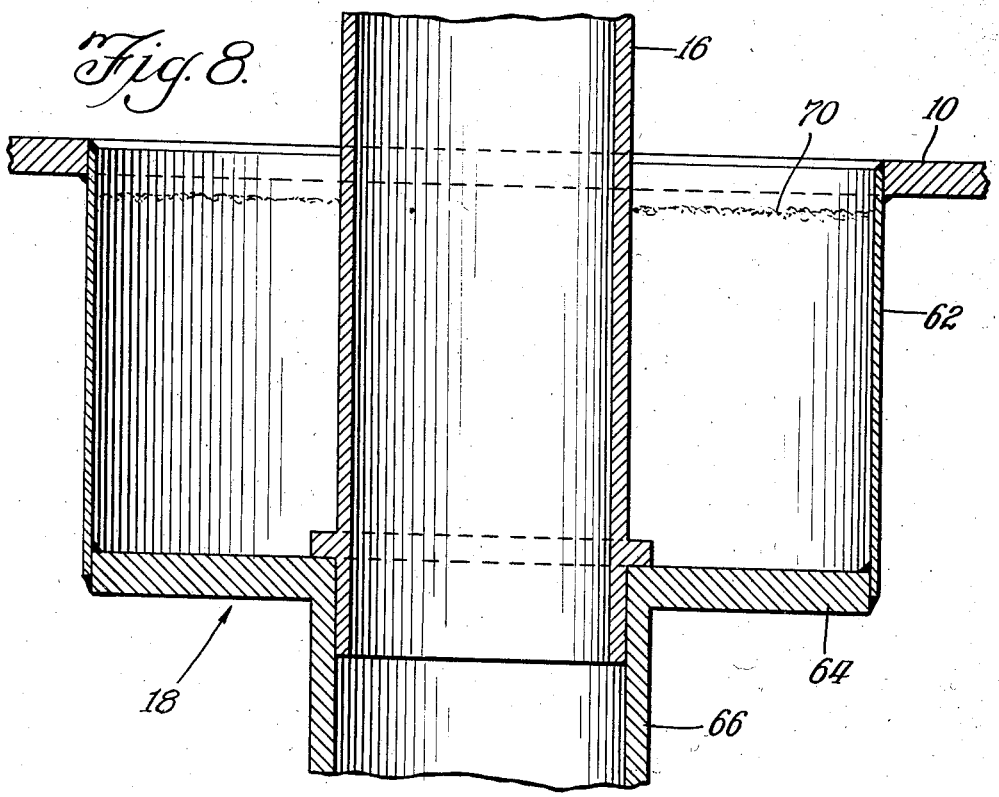
Figure 8 is a section as on line 8—8 of Figures 3 and 4 indicating the connection for the outlet pipe.

At very high temperatures one of the worst heat losses to be guarded against is at the outlet for the hot gas. Referring to Figure 8, it will be noted that the outlet pipe 16, if it were welded directly to the shell 10, as the inlet pipe 12 is, would heat the shell 10 to a very high temperature for a considerable area, and thus cause a large heat loss. The shell 10 is apertured to a diameter affording a substantial clearance around the discharge pipe 16, and in that aperture is welded a shell 62 of relatively thin metal of an alloy having particularly low heat conductivity. Ordinary sheet steel could be employed, but the higher cost of the alloy is usually justified by its much lower thermal conductivity. The lower edge of the shell 62 is welded to a bottom plate 64 which is continued on down at 66 to form a continuation of the exhaust tube 16. The annular space between the pipe 16 and the shell 62 is filled with a suitable insulating material 70. And of course the pipe 66 and the externally exposed surface of the plate 64 can be jacketed with thermal insulation as may be required. It has been found that with discharge gases at 1800° or 2,000° F., the temperature of the shell 10 adjacent the shell 62 is substantially the same as elsewhere, with substantially the entire temperature drop taking place along the length of the shell 62.

Figure 9:
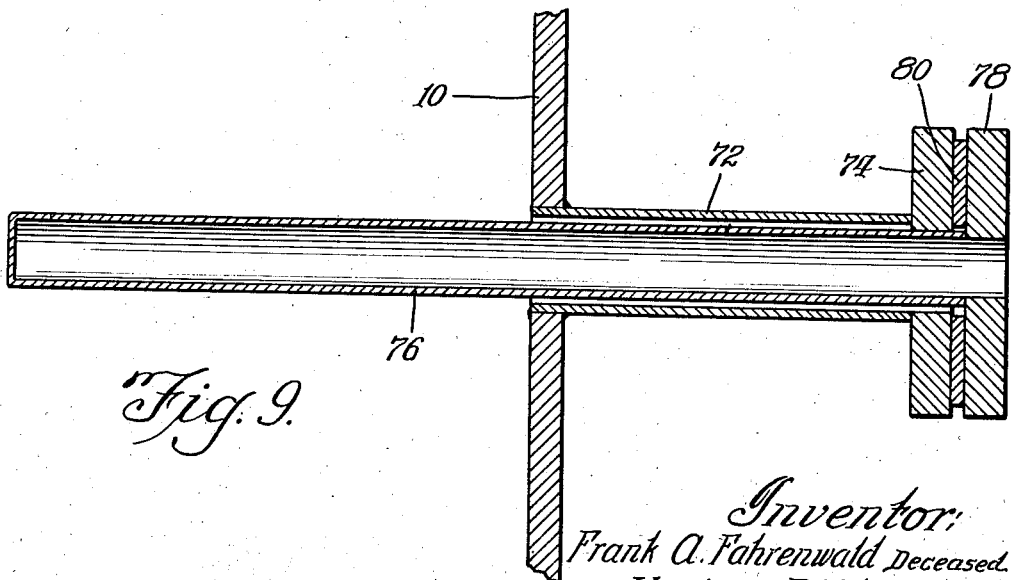
Figure 9 is a section on line 9—9 of Figure 4 indicating the thermocouple mounting.

Figure 9 indicates the use of the same principle for the mounting for a thermocouple for use in controlling the operation of the heater. The tube 72 may be of the same low conductivity alloy as the tube 62 and carries a plate 74 welded to its outer end. The housing tube for the thermocouple proper is indicated at 76 and is spaced from the tube 72 and extends far enough into the furnace to afford a reliable indication of the operating temperature at its inner end. The tube 76 carries another plate 78 at its outer end, and a gas-tight seal is obtained by compressing the sealing washer 80 between the plates 74 and 78 as by means of suitable clamps or bolts (not shown).

In one commercial installation, having a capacity of 110 kva. and employed to heat 200 cubic feet of hydrogen per minute under 7 pounds gauge pressure to 1200° F., with a control permitting a variation of only 1° above or below the specified delivery temperature, the observed temperature of the outer steel shell is 180° F. and the unit operates at 89.9% efficiency. In this unit, which is operated 24 hours per day for long periods of time, performance records indicate that the surfaces of the septums and the chamber wall combined, are delivering more heat to the gas than is picked up by the gas from its contact with the resistors themselves. Also, the temperature difference between the resistors and the septums is too small to be readily measured. In other words the heat transfer from the resistors to the septums by radiation is many times more effective than the contact heat transfer to the gas from either the septums or the resistors. Suitable control can be secured by varying the current throughout the entire series of resistors, or by operating a substantial portion of them at the inlet end under full power constantly, and varying the current only on a portion of the resistors near the discharge end to secure precise temperature control. The extremely accurate temperature control obtainable is believed to be due to the fact that the large amount of extra material embodied in the refractory septum constitutes a large heat reservoir, and prevents rapid temperature fluctuations in the delivered gases. The area of hot refractory exposed to physical contact with the gases is more than half of the total area from which the gases receive heat.

Figures 10, 11:
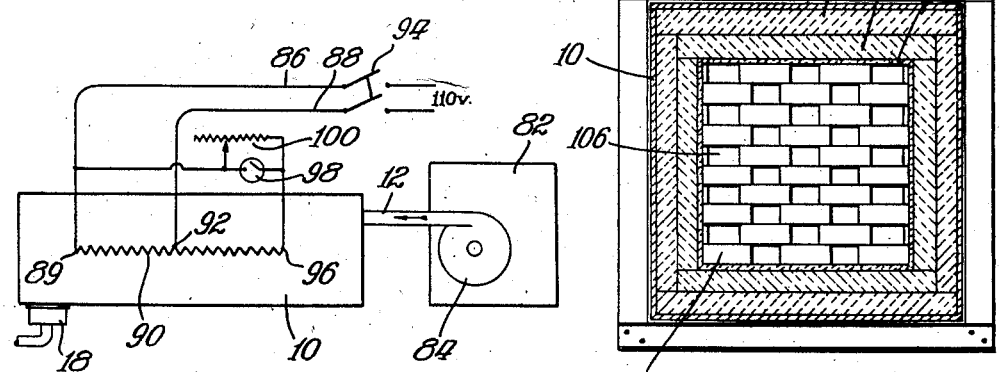
Figure 10 is a wiring diagram.
Figure 11 is a view similar to Figure 6 showing a modified type of partition.

Referring to Figure 10, it indicates diagrammatically a gas container 82 from which the power driven unit 84 forces gas into the inlet pipe 12. Either alternating or direct current may be supplied to the positive line 86 and the negative line 88. The positive line is connected to one end 89 of the resistance 90, and the negative line is connected at 92 at an intermediate point so that the resistance between 89 and 92 always operates under full load whenever the switch 94 is closed. The other section of resistance between the point 92 and the right end 96 is wired in series through a relay 98 controlled by the thermocouple in the furnace. The relay 98 is shunted by the adjustable control rheostat 100. Accordingly, a slight rise in the temperature of the gas being delivered can be made effective to open the relay 98 and reduce the current in the controlled section of the resistance by a predetermined amount, which amount may be adjusted by the operator by means of the rheostat 100.

Referring now to Figures 12 to 14, inclusive, each vertical reach 102 of the resistor grid has the H-shaped cross section best indicated in Figure 14 with a relatively thick web and very short flanges at the ends. This provides important structural strength for the reach, but it also takes into consideration questions of radiation and convection.

With respect to radiation, the short ribs hardly affect the web at all, and permit nearly every portion of each face of the reach to have exposure to the adjacent refractory over very nearly a complete hemisphere.

With respect to convection, in the heater illustrated in Figure 5, the gases in each pass flow parallel to the reaches and are rapidly mixed as they go from one pass to the next, first by the change in the cross section of their flow stream when the reaches are replaced by the bights 32 and 34, and secondarily by making two right angle turns to get into the next passage, with portions of the bights 32 and 34 projecting into each turn.

Furthermore, the same shape will operate in a different and effective way to maintain mixing in a heater where the path of the gas is much shorter. For this purpose, the partitions 26 and 28 may be replaced by partitions extending from top to bottom with clearances at alternate sides of the chamber. This will direct the gas flow horizontally, as seen in Figure 12, instead of vertically, and the gas stream will eddy around the short flanges of each reach and thus be subjected to sixteen gentle mixings while passing over one grid. And finally, the same identical shape functions with substantially equal efficiency with partitions according to Figure 11 in which each partition is a checkerwork laid up of individual refractory bricks 104 to leave openings 106, which openings are mismatched in successive partitions. This permits the entire body of gas in the chamber to flow more by percolation than by eddying, in a single body which, as a whole, moves uniformly over the entire cross section of the chamber from one end of the chamber to the other, with the gas streaming through between the reaches 102 and then turning laterally a little to stream through a set of openings 106 before encountering the next grid. And in this embodiment also, each point on the grid can radiate over substantially a complete hemisphere to adjacent refractory. No loss of efficiency is involved in having part of this radiation pass through the immediately adjacent partition and impinge on the individual bricks 104 of the next partition.

Without further elaboration, the foregoing will so fully explain my invention that others may, by applying knowledge current at present or in the future, readily adapt the same for use under various conditions of service. It will, for instance, be obvious that if the gas travels from side to side instead of from top to bottom, the spacers 30 would merely be omitted, and that if substantial pressures were desired, the shell 10 could readily be made of the circular shape best adapted to withstand pressure. Pressure is desirable to maintain the purity of the gas being heated, and whenever the delivery temperature is above the inversion temperature for the gas in question, the hot gas delivered under pressure will have its temperature increased by the subsequent release of the pressure. This will always be true with hydrogen. Also, the actual weight of gas subject to heating action in the chamber is more at 15 pounds gauge than it would be with the chamber at atmospheric pressure. Similarly, the use of partitions of refractory metal will be advantageous when compactness is especially desirable.

What is claimed is:

1. A gas heater comprising, in combination: a gas-tight steel housing; thick refractory walls lining said housing; each wall built up of a plurality of layers; each layer being laid up of separate bricklike pieces; the refractory in successive layers having thermal conductivity decreasing outwardly and heat resistance increasing inwardly; said refractory walls defining a chamber; refractory partitions in said chamber occupying a space of the order of magnitude of half the chamber volume; said partitions extending inwardly from one side of said chamber but terminating short of the opposite side and extending alternately from opposite sides to define within said chamber a tortuous passage made up of a succession of transverse straight passes extending from side to side of said chamber; each pass having a dimension transverse to itself and longitudinal of the chamber, of the same order of magnitude as the thickness of the adjacent partitions; cast metal resistors, each in a transverse pass of said passage; each resistor having a plurality of reaches extending from side to side of the area defined by said pass and connected at alternate sides of said pass by U-shaped bights to form a single metal conductor element of a length many times the maximum dimension of said pass; electrical connections connecting one end of each resistor to the end of an adjacent resistor to form a single series resistance of all said resistors; each reach of said resistor having an I-shaped cross section with a thick web and narrow flanges; certain of said resistor bights having extensions forming supporting pads to engage an adjacent refractory wall and support the weight of said resistor; certain of said resistor reaches having lugs projecting longitudinally of the chamber and transversely of the pass to maintain the adjacent partitions in spaced relationship; said walls, partitions, and resistors being stacked in said housing and held in assembled position by gravity and contact with each other only; and means for passing gas to be heated into one end of said passage and out at the other end.

2. A gas heater comprising, in combination: a gas-tight steel housing; refractory walls lining said housing; said refractory walls defining a chamber; refractory partitions in said chamber occupying a space of the order of magnitude of half the chamber volume; said partitions defining within said chamber a tortuous passage made up of a succession of transverse straight passes extending from side to side of said chamber; cast metal resistors in said passage; electrical connections connecting one end of said resistor to the end of an adjacent resistor to form a single series resistance of all said resistors; each reach of said resistor having an I-shaped cross section with a thick web and narrow flanges; said walls, partitions, and resistors being stacked in said housing and held in assembled position by gravity and contact with each other only; and means for passing gas to be heated into one end of said passage and out at the other end.

3. A gas heater comprising, in combination: a housing including refractory walls defining a chamber; refractory partitions in said chamber defining within said chamber a tortuous passage made up of a succession of transverse straight passes extending from side to side of said chamber and interconnected in series to guide a fluid in a serpentine path from one end of said chamber to the other; electrical resistors, each in a transverse pass of said passage; said walls, partitions, and resistors being stacked in said housing and held in assembled position by gravity and contact with each other only; and mean for passing gas to be heated into one end of said passage and out at the other end; said resistors being sufficiently powerful to maintain the wall surfaces of said passages at temperatures of incandescence in the presence of a current of gas to be heated.

4. A gas heater comprising, in combination: a housing including refractory walls defining a chamber; refractory partitions in said chamber occupying a space of the order of magnitude of half the chamber volume; said partitions defining within said chamber a tortuous passage made up of a succession of transverse passes interconnected in series to guide a fluid in a serpentine path from one end of said chamber to the other; electrical resistors, each in a transverse pass of said passage; each resistor having a cross section centrally located in said passage to cause distributive mixing of the gas flowing through said passage; said resistors being sufficiently powerful to maintain the wall surfaces of said passages at temperatures of incandescence in the presence of a current of gas to be heated.

5. In a heater for heating gases to temperatures above 600° F., in combination: a secondary gas-heating element in the nature of a refractory body defining a chamber with thick walls and a tortuous passage through said chamber, the turns in said passage being separated by thick refractory partitions; a metallic heating element irregularly positioned, centrally of said tortuous passage to cause gas passing through said passage to flow irregularly and maintain a high rate of convective heat transfer in the gas stream; an external source of electrical energy for maintaining said heating element at a high temperature by resistance heating of the metal itself; and means for forcing through said tortuous passage a stream of gas to be heated; said passage having more area exposed to gas contact than said element; said partitions being of refractory non-metallic material adapted to resist heating of the partitions themselves to temperatures of incandescence.

6. In a heater for heating gases, in combination: a secondary gas-heating element in the nature of a refractory body defining a chamber with thick walls and a tortuous passage through said chamber, the turns in said passage being separated by refractory partitions; a metallic heating element irregularly positioned, centrally of said tortuous passage to cause gas passing through said passage to flow irregularly and maintain a high rate of convective heat transfer in the gas stream; a source of energy for maintaining said heating element at a high temperature; and means for forcing through said tortuous passage a stream of gas to be heated; said partitions being of refractory non-metallic material adapted to resist heating of the partitions themselves to temperatures of incandescence.

7. In a heater for heating gases, in combination: a secondary heating element in the nature of a refractory body defining a walled passage; a primary metallic heating element partially and irregularly obstructing said tortuous passage to cause gas passing through said passage to flow irregularly and maintain a high rate of convective heat distribution in the gas stream; an external source of electrical energy for maintaining said heating element at a high temperature by resistance heating of the metal itself; and means for forcing through said passage a stream of gas to be heated; said passage having more area exposed to gas contact than said element, whereby substantially half of the heat received by said gas passes by radiation from said element to said passage walls, and by contact and conduction from said passage walls to said gas; said partitions being of refractory non-metallic material adapted to resist heating of the partitions themselves to temperatures of incandescence.

8. In a heater for heating gases to temperatures above 600° F., in combination: refractory walls defining a passage having a rectangular cross section of width several times its thickness; and a radiant heating element of cast metal adapted to be kept hot by the passage of electric current through it; said heating element lying in the center of said passage and having a maximum dimension in the direction of the thickness of the passage approximately one third of the passage thickness, whereby gases passing along said passage are accelerated and retarded in getting past said element and thus kept mixed; said passage having a refractory surface area exposed to gas contact greater than the exposed surface of said heating element, whereby substantially at least half the heat delivered to said gas is delivered by radiation from said element to the passage walls, and by contact, or conduction, from said passage walls to said gas.

9. In a heater for heating gases to temperatures above 600° F., in combination: refractory walls defining a passage having a rectangular cross section; and a radiant heating element adapted to be kept hot by the passage of electric current through it; said heating element lying in the center of said passage and having a maximum dimension in the direction of the thickness of the passage approximately one third of the passage thickness whereby gases passing along said passage are accelerated and retarded in getting past said element and thus kept mixed; said passage having a wall surface area exposed to gas contact greater than the exposed surface area of said heating element, whereby substantially at least half the heat delivered to said gas is delivered by radiation from said element to the passage walls, and by contact, or conduction, from said passage walls to said gas.

10. In a heater for heating gases, in combination: refractory walls defining a passage; and a radiant heating element adapted to be kept hot by the passage of electric current through it; said heating element lying in said passage; means for mixing the gases passing along said passage; said passage having a wall surface area exposed to gas contact greater than the exposed area of said heating element, whereby substantially at least half the heat delivered to said gas is delivered by radiation from said element to the passage walls, and by contact, or conduction, from said passage wall to said gas; said partitions being of refractory non-metallic material adapted to resist heating of the partitions themselves to temperatures of incandescence.

11. A resistor element for gas heating furnaces comprising, in combination: a casting including a plurality of parallel reaches; each reach having an I-shaped cross section with a flange width only one quarter of its height and a web thickness one-eighth of its height; said reaches being interconnected in series by U-shaped bights at alternate ends; said bights being devoid of flanges and having webs thicker than said reaches to secure the same cross sectional area as that of said reaches; certain of said bights having integral pad lugs projecting in the plane of said element; certain of said reaches having spacer lugs projecting at right angles from the plane of said element; said lugs being shaped and proportioned to engage the surfaces of refractory walls defining a space enclosing said element and thereby hold both said element and said walls in spaced relationship.

12. A resistor element for gas heating furnaces comprising, in combination: a casting including a plurality of parallel reaches interconnected in series by U-shaped bights at alternate ends; certain of said bights having integral pad lugs projecting in the plane of said element; certain of said reaches having spacer lugs projecting at right angles from the plane of said element; said spacer lugs projecting in both directions from the plane of said element; said lugs being shaped and proportioned to engage the surfaces of refractory walls defining a space enclosing said element and thereby hold both said element and said walls in spaced relationship.

13. A resistor element for gas heating furnaces comprising, in combination: a metal body including a plurality of parallel reaches interconnected at alternate ends; and lugs projecting from said body and shaped and proportioned to engage the surfaces of refractory side walls defining a space enclosing said element to support said element and to hold both said element and said walls in spaced relationship.

14. In a heater for heating gases, in combination: a refractory chamber; a series of resistance grids arranged transversely of said chamber; deflecting means between each grid and the adjacent grids for mixing the gases passing through said chamber; said deflecting means including perforated partitions having their perforations staggered; said staggered perforations being positioned alternately adjacent opposite sides of said chamber; and means for forcing a gas to be heated through said chamber.

15. In a heater for heating gases, in combination: a refractory chamber; a series of resistance grids arranged transversely of said chamber; deflecting means between each grid and the adjacent grids for mixing the gases passing through said chamber; said deflecting means including perforated partitions having their perforations staggered; and means for forcing a gas to be heated through said chamber.

16. A cast resistance grid of chrome alloy steel having integral projections out of the path of current flow; said projections extending downward from the lower portion of said grid to carry the weight of said grid on an underlying support; said grid lying in a vertical plane and said projections being located along the lower edge of said grid; said grid having a plurality of horizontally projecting lugs located at spaced points; the points of said lugs lying in a common plane parallel to but spaced from said grid; and passage walls enclosing said grid and including horizontal walls underlying said supporting projections; and vertical walls held spaced from said grid by contact with said lugs.

17. A cast resistance grid having integral projections out of the path of current flow; said projections extending downward from the lower portion of said grid to carry the weight of said grid on an underlying support.

18. A resistance grid having integral projections out of the path of current flow; said projections extending downward from the lower portion of said grid to carry the weight of said grid on an underlying support; the lower ends of said projections having enlarged downwardly facing contact surfaces.

19. A resistance grid having integral projections out of the path of current flow; said projections extending downward from the lower portion of said grid to carry the weight of said grid on an underlying support; said grid lying in a vertical plane and said projections from portions of said grid located along the lower edge of said grid; said grid having a plurality of horizontally projecting lugs located at spaced points; the points of said lugs lying in a common plane parallel to but spaced from said grid; a wall underlying said supporting projections; and a vertical wall held spaced from said grid by contact with said lugs.

20. A resistance grid having integral projections out of the path of current flow; certain of said projections extending downward from the lower portion of said grid to carry the weight of said grid on an underlying support; said grid having also a plurality of projecting lugs located at spaced points and out of the path of current flow; the points of said lugs lying in a common plane parallel to but spaced from said grid.

MARJORIE P. FAHRENWALD,
*Executrix of the Estate of Frank A. Fahrenwald, Deceased.*